United States Patent
Enomoto

(10) Patent No.: US 12,424,005 B2
(45) Date of Patent: Sep. 23, 2025

(54) IMAGE PROCESSING APPARATUS AND IMAGE PROCESSING METHOD FOR IDENTIFYING A CLASSIFICATION TYPE OF A DOCUMENT IMAGE

(71) Applicant: CANON KABUSHIKI KAISHA, Tokyo (JP)

(72) Inventor: Makoto Enomoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 428 days.

(21) Appl. No.: 18/050,354

(22) Filed: Oct. 27, 2022

(65) Prior Publication Data
US 2023/0137138 A1  May 4, 2023

(30) Foreign Application Priority Data
Oct. 29, 2021 (JP) .................................. 2021-177091

(51) Int. Cl.
*G06V 30/10* (2022.01)
*G06F 40/295* (2020.01)
*G06V 30/413* (2022.01)

(52) U.S. Cl.
CPC ............ *G06V 30/10* (2022.01); *G06F 40/295* (2020.01); *G06V 30/413* (2022.01)

(58) Field of Classification Search
CPC ..... G06V 30/10; G06V 30/413; G06F 40/295
USPC .......................................................... 382/229
See application file for complete search history.

(56) References Cited

U.S. PATENT DOCUMENTS

| | | | | |
|---|---|---|---|---|
| 4,985,863 | A * | 1/1991 | Fujisawa | G06F 16/58 382/229 |
| 6,470,336 | B1 * | 10/2002 | Matsukawa | G06F 16/93 382/229 |
| 9,582,913 | B1 * | 2/2017 | Kraft | G06T 11/60 |
| 2004/0223197 | A1 * | 11/2004 | Ohta | G06F 16/56 707/E17.027 |
| 2017/0249507 | A1 * | 8/2017 | King | H04N 1/00331 |
| 2019/0236349 | A1 * | 8/2019 | Eapen | G06V 30/413 |

FOREIGN PATENT DOCUMENTS

| | | |
|---|---|---|
| JP | 2013251610 A | 12/2013 |
| JP | 2018097813 A | 6/2018 |
| JP | 2021033902 A | 3/2021 |

* cited by examiner

*Primary Examiner* — Allen H Nguyen
(74) *Attorney, Agent, or Firm* — Canon U.S.A., Inc. IP Division

(57) ABSTRACT

The present application is to obtain a character recognition result by performing character recognition processing on a document image and identify a classification type of the document image based on a character string included in the character recognition result and a predefined condition. The condition for identifying classification types that are hints for expense items is defined in advance.

16 Claims, 14 Drawing Sheets

FIG. 1C

| DATE | DEBIT [CODE] | DEPARTMENT [CODE] | MONEY AMOUNT (INCLUDING TAX) | REMARKS | CREDIT [CODE] | DEPARTMENT [CODE] | MONEY AMOUNT (INCLUDING TAX) |
|---|---|---|---|---|---|---|---|
| ... | ... | ... | ... | ... | ... | ... | ... |
| NOV. 12, 2020 | EXPENSE FOR OFFICE SUPPLIES [300] | KAMATA BRANCH [221] | 7,700 | AAA BUSINESS MACHINE CORPORATION | CASH [100] | KAMATA BRANCH [221] | 7,700 |
| | | | | | | | |

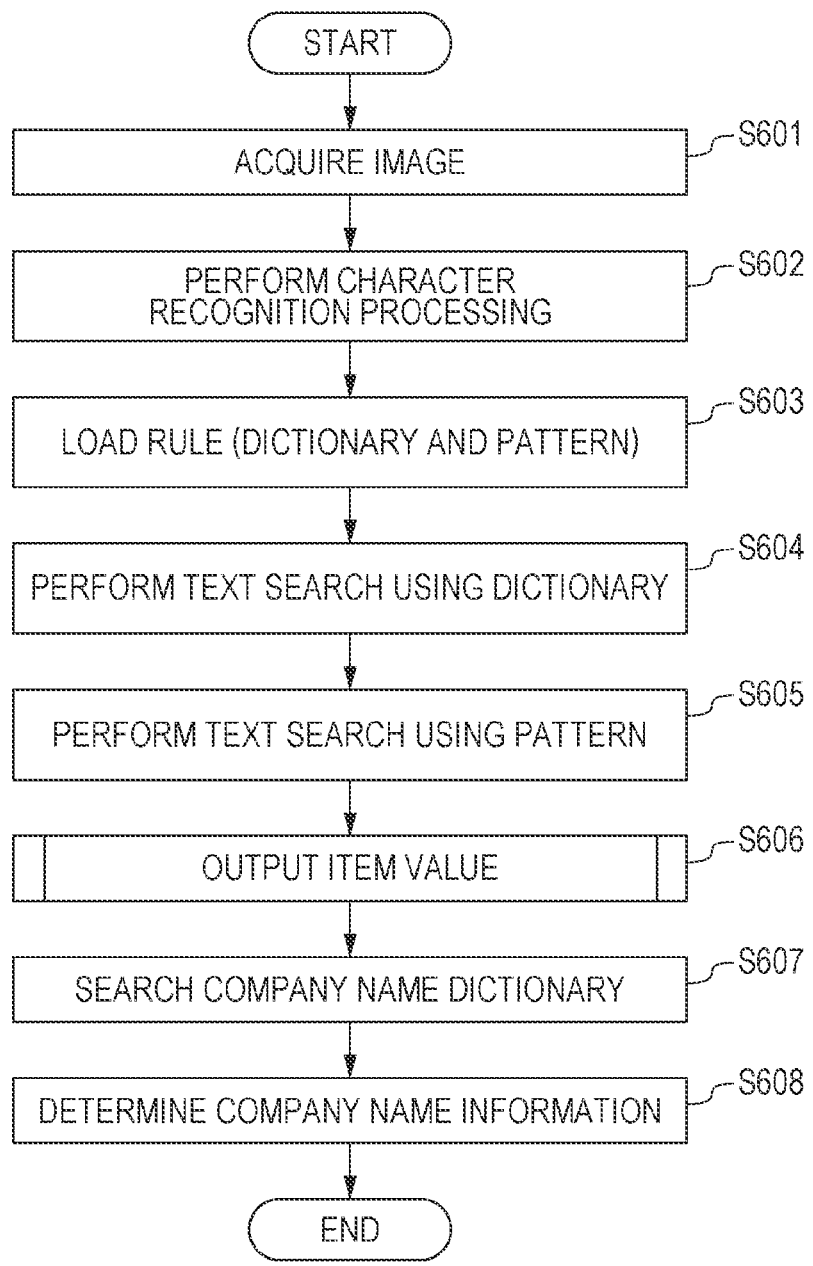

FIG. 7A

| NUMBER | DICTIONARY NAME | SEARCH CHARACTER STRINGS |
|---|---|---|
| 701 | TOTAL KEY | "TOTAL MONEY AMOUNT", "AMOUNT PAID", "AMOUNT RECEIVED" |
| 702 | PHONE KEY | "TEL", "PHONE" |
| 703 | TAXI TERM A | "TAXI", "LIMOUSINE" |
| 704 | TAXI TERM B | "LICENSE PLATE NUMBER", "VEHICLE NUMBER", "RADIO NUMBER" |
| 705 | TAXI TERM C | "FARE", "METER RATE" |

FIG. 7B

| NUMBER | PATTERN NAME | SEARCH PATTERN |
|---|---|---|
| 711 | MONEY AMOUNT | "\?[\d,]+yen" |
| 712 | PHONE NUMBER | "0\d{1,3}[-(]\d{2,4}[-)]\d{4}" |

FIG. 7C

| NUMBER | ITEM NAME | TYPE | CONDITION | TEXT SEARCH | OUTPUT VALUE |
|---|---|---|---|---|---|
| 721 | TOTAL MONEY AMOUNT | POSITIONS OF SEARCH RESULTS | VALUE IS TO RIGHT OF KEY | KEY: TOTAL KEY VALUE: MONEY AMOUNT | VALUE OF SEARCH RESULT DETERMINED AS VALUE |
| 722 | PHONE NUMBER | POSITIONS OF SEARCH RESULTS | VALUE IS TO RIGHT OF KEY | KEY: PHONE KEY VALUE: PHONE NUMBER | VALUE OF SEARCH RESULT DETERMINED AS VALUE |
| 723 | COMPANY NAME TYPE | LOGICAL OPERATION OF SEARCH RESULTS | LOGICAL EXPRESSION: "TAXI TERM A | (TAXI TERM B & TAXI TERM C)" IS TRUE | TAXI TERM A, TAXI TERM B, TAXI TERM C | TAXI |

FIG. 10A

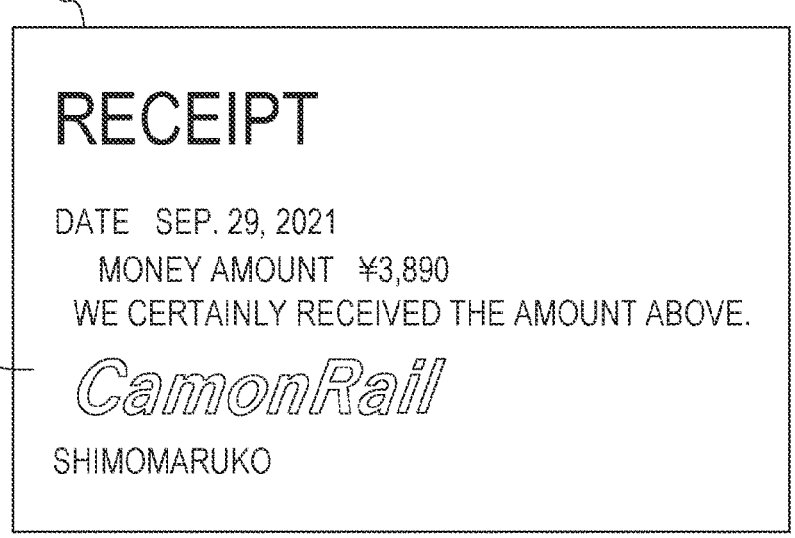

FIG. 10B

| NUMBER | ITEM NAME | TYPE | CONDITION | TEXT SEARCH | OUTPUT VALUE |
|---|---|---|---|---|---|
| 721 | TOTAL MONEY AMOUNT | POSITIONS OF SEARCH RESULTS | VALUE IS TO RIGHT OF KEY | KEY: TOTAL KEY VALUE: MONEY AMOUNT | VALUE |
| 722 | PHONE NUMBER | POSITIONS OF SEARCH RESULTS | VALUE IS TO RIGHT OF KEY | KEY: PHONE KEY VALUE: PHONE NUMBER | VALUE |
| 723 | COMPANY NAME TYPE | LOGICAL OPERATION OF SEARCH RESULTS | TAXI TERM A | (TAXI TERM B & TAXI TERM C) | TAXI TERM A, TAXI TERM B, TAXI TERM C | TAXI |
| 1011 | COMPANY NAME TYPE | IMAGE SIZE | WIDTH=85 mm AND HEIGHT=58 mm | – | RAILROAD |

FIG. 10C

| RESOLUTION | 300×300 dpi |
|---|---|
| IMAGE SIZE (PIXELS) | 1000×680 |

FIG. 13A

| NUMBER | DICTIONARY NAME | SEARCH CHARACTER STRING |
|---|---|---|
| 1301 | AIRLINE TICKET TERMINOLOGY | "AIRLINE", "AVIATION" |
| 1302 | CONVENIENCE STORE TERMINOLOGY | "CONVENIENCE STORE" |
| 1303 | WEBSITE TERMINOLOGY | "DISPLAY DATE" |
| 1304 | AGENCY TERMINOLOGY | "TRAVEL", "AGENT", "AGENCY" |

FIG. 13B

| NUMBER | ITEM NAME | TYPE | CONDITION | TEXT SEARCH | OUTPUT VALUE |
|---|---|---|---|---|---|
| 1311 | COMPANY NAME TYPE (PURCHASE TYPE) | LOGICAL OPERATION OF SEARCH RESULTS | AIRLINE TICKET TERMINOLOGY AND CONVENIENCE STORE TERMINOLOGY | AIRLINE TICKET TERMINOLOGY, CONVENIENCE STORE TERMINOLOGY | AIRLINE TICKET (CONVENIENCE STORE) |
| 1312 | COMPANY NAME TYPE (PURCHASE TYPE) | LOGICAL OPERATION OF SEARCH RESULTS | AIRLINE TICKET TERMINOLOGY AND WEBSITE TERMINOLOGY | AIRLINE TICKET TERMINOLOGY, WEBSITE TERMINOLOGY | AIRLINE TICKET (ONLINE) |
| 1313 | COMPANY NAME TYPE (PURCHASE TYPE) | LOGICAL OPERATION OF SEARCH RESULTS | AIRLINE TICKET TERMINOLOGY AND AGENCY TERMINOLOGY | AIRLINE TICKET TERMINOLOGY, AGENCY TERMINOLOGY | AIRLINE TICKET (AGENCY) |

FIG. 13C

| NUMBER | COMPANY NAME | COMPANY NAME TYPE | PURCHASE TYPE | OUTPUT OF COMPANY NAME INFORMATION |
|---|---|---|---|---|
| 1321 | PRESENT | PRESENT | CONVENIENCE STORE | COMPANY NAME TYPE (PURCHASE TYPE) |
| 1322 | PRESENT | PRESENT | AGENCY | COMPANY NAME TYPE (PURCHASE TYPE) |
| 1323 | PRESENT | -- | -- | COMPANY NAME |
| 1324 | NOT PRESENT | PRESENT | -- | COMPANY NAME TYPE (PURCHASE TYPE) |
| 1325 | NOT PRESENT | NOT PRESENT | -- | NOT PRESENT |

IMAGE PROCESSING APPARATUS AND IMAGE PROCESSING METHOD FOR IDENTIFYING A CLASSIFICATION TYPE OF A DOCUMENT IMAGE

BACKGROUND

Field of the Disclosure

The present disclosure relates to an image processing apparatus that identifies a classification type of a document image, and relates to an image processing method and a non-transitory computer-readable storage medium.

Description of the Related Art

In recent years, it is common to scan and computerize a document by using an image scanner included in a multifunction peripheral (MFP) (multifunction apparatus with functions of printing, copying, faxing, and the like) or the like. In addition, it is also common to computerize a document by using a camera function of a mobile apparatus represented by digital cameras and smartphones to capture an image of the document. Thus, it has become easier to obtain a document image (scanned document image) by optically scanning a document including handwritten characters and printed characters or by capturing an image of the document. In addition, it is possible to convert a character image in the document image into a computer-usable character code by performing optical character recognition (OCR) processing on the document image. Due to the use of the character recognition processing, it is becoming common to automate tasks (for example, expense reimbursement work) of converting business forms (receipts, invoices, and the like) of paper media into digital data and entering the digital data into a system. Therefore, it is expected to improve productivity in data entry tasks.

In Japanese Patent Laid-Open No. 2018-097813, journalizing AI is created by extracting, from an image for learning, journalizing elements including at least a date, a supplier, a money amount, remarks, and exteriors such as a size and a color, and performing machine learning on accounts for the journalizing elements. Then, to process a voucher image, journalizing elements are extracted from the voucher image and the journalizing AI is used to select accounts.

In the method described in Japanese Patent Laid-Open No. 2018-097813, it is necessary to perform learning by machine learning in advance and many image data items for learning are required. Furthermore, when rules for journalizing expense items differ for each user, it is necessary to prepare learning data for each user.

SUMMARY

An image processing apparatus disclosed herein includes a character recognizing unit that obtains a character recognition result by performing character recognition processing on a document image, and a first identifying unit that identifies a classification type in accordance with a character string included in the character recognition result and a predefined condition.

Further features of the present disclosure will become apparent from the following description of exemplary embodiments with reference to the attached drawings.

BRIEF DESCRIPTION OF THE DRAWINGS

FIGS. 1A, 1B, and 1C are diagrams illustrating an outline of processing for bookkeeping and/or accounting work, an example of a document image, and an example of input contents for the processing.

FIG. 6 is a diagram illustrating an overall process according to one or more aspects of the present disclosure.

FIGS. 7A, 7B, and 7C are diagrams illustrating examples of a processing rule according to one or more aspects of the present disclosure.

FIGS. 10A, 10B, and 10C are diagrams illustrating an example of input information according to one or more aspects of the present disclosure.

FIGS. 13A, 13B, and 13C are diagrams illustrating examples of a rule according to one or more aspects of the present disclosure.

DESCRIPTION OF THE EMBODIMENTS

Figures 1A, 1B:
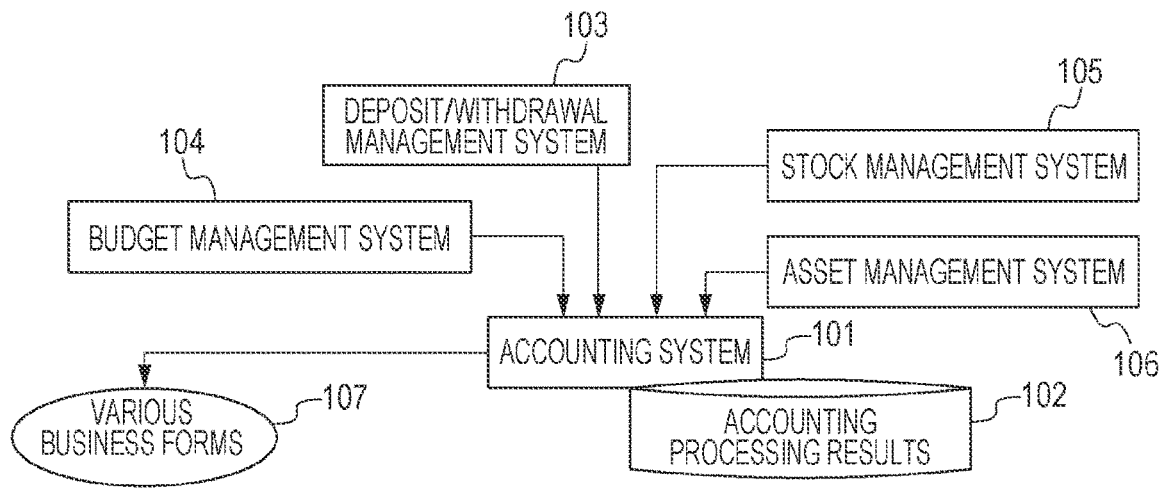

FIG. 1A illustrates the flow of information between an accounting system and various systems that coordinate with the accounting system.

An accounting system 101 supports accounting and/or bookkeeping tasks. A person in charge of accounting and/or bookkeeping records transactions of cash, deposits, assets, products, and the like of a company in the accounting system 101 while classifying the transactions for management or tax purposes, and various forms that were conventionally used as business forms are computerized in the accounting system 101. The recorded contents are stored as accounting processing results 102 and output as various business forms 107 as necessary. The accounting system 101 needs to classify expense items for the transactions according to the contents and purposes of the transactions and uses expense item codes in order to identify each of the expense items.

In addition, the above-described various systems include a deposit/withdrawal management system 103 that manages cash, deposits, and the like, a budget management system 104 that manages budgets of each department, a stock management system 105 that manages the stock of products, and an asset management system 106 that manages various assets. When a transaction of cash, a deposit, an asset, a product, or the like occurs, an increase or decrease in cash and the like involved in the transaction is recorded in each of the management systems (103, 105, and 106).

Conventionally, the person in charge of accounting and/or bookkeeping refers to information of each transaction recorded in each of the management systems (103, 105, and 106) and records information in the accounting system 101. In addition, the budget management system 104 uses a budget code for identification of each budget in order to manage budgets.

FIG. 1B illustrates a business form document 110 that is an example of a receipt (business form document) issued when office supplies are purchased. This receipt is a voucher (documented evidence) that certifies the purchase of the office supplies. Various information items are written on parts included in the business form document 110. For example, information indicating that this business form document is a "receipt" is written on a document title 111, which is a title part of the business form document 110. An issuance date 112 indicates a date when the business form document was issued. When the receipt of the business form document is stored as a voucher in accounting and/or bookkeeping work, information of "Nov. 12, 2020" that is the issuance date 112 may be used in order to identify the business form document.

As information of a company (issuer) that created and issued the business form document, information of the name of the company, an address of the company, and a phone number of the company is written on an issuer 113. When the business form document is received and is to be processed for accounting and/or bookkeeping, it is necessary to clarify the purchased items and the purpose for the purchase in order to classify an expense item, and information of the company name "AAA Business Machine Corporation" of the issuer 113 may be used for the clarification. In addition, when the receipt of the business form document is stored as a voucher, information of the company name may be used to identify the business form document.

The name of the company that purchased and paid for the office supplies is written on a name 114. The total money amount for the purchase and payment is written on a total money amount 115. When the business form document is to be processed for accounting and/or bookkeeping, this money amount (and the amount of tax for the purchase as necessary) is used as a money amount of the transaction. Detailed billing information is written on details 116. For each of the product names, information of a unit price, a quantity, a price, and the like of each of the products is written. In addition, a total 117 indicates that the subtotal of the prices and information of tax and the like are summed and make up the total money amount written on the total money amount 115.

FIG. 1C illustrates an example of information of a business form generally recorded in the accounting system 101 by the person in charge of accounting and/or bookkeeping. A transaction record 120 on the business form indicates a transaction used for accounting and/or bookkeeping in a business form and is indicated in a table form. This table indicates one transaction in one row, and a transaction date is written at the initial position and each information item is written in the table.

An example in which transaction information of a certain department (section) is recorded is described below. For example, the contents of the purchase of office supplies to be used for work are recorded and a money amount to be paid for the purchase of the office supplies is recorded in advance as a budget for the department in the budget management system 104. It is assumed that, in the department, according to the contents of the purchase, the department purchased the office supplies from the company of the company name "AAA Business Machine Corporation" on "Nov. 12, 2020" and paid cash for the office supplies from the deposit/withdrawal management system 108.

In this case, it is necessary to record information indicating that the money amount for the purchase was withdrawn. In addition, in this case, it is assumed that, to certify that the purchase and the payment were made, the company of the company name "AAA Business Machine Corporation" issued the business form document 110 as a voucher and BBB Corporation obtained the business form document 110. In this case, in the transaction record 120 on the business form, the following contents are written in three columns (sixth to eighth columns from the left) for a "credit" and the subsequent items. That is, "cash" and a code "100" indicating the type of cash that are included in a withdrawal record of the deposit/withdrawal management system 103, a department name "Kamata branch" and a budget code "221" as budget information from the budget management system 104, and a money amount "7,700" yen that was paid are written. Furthermore, in the transaction record 120 on the business form, the following contents are written in three columns (second to fourth columns from the left) for a "debit" and the subsequent items. That is, information indicating that the "Kamata branch" used "7,700" yen as the expense for the office supplies is written. Therefore, the person in charge of accounting and/or bookkeeping writes an expense item "expense for office supplies" and an expense item code "300" to the "debit", writes the department name "Kamata branch" and the budget code "221" to the "department", and writes "7,700" yen to the "money amount". Furthermore, as a basis for the classification of the expense item, the person in charge writes "AAA Business Machine Corporation" to "remarks" in order to facilitate the association of the business form document 110. By writing such information as described above, it is possible to record facts such as the withdrawal of cash from assets and the purchase of office supplies based on budgets of a department as transactions used as expenses for the office supplies in association with each other. The person in charge of accounting and/or bookkeeping confirms each fact including the voucher in order to record the information, classifies the information into expense items, and records the information in the accounting system 101. The recorded contents stored in the accounting system 101 are the accounting processing results 102.

When a function of automatically transferring the contents (the date, the money amount, the company name, and the like) written on the business form document 110 to the accounting system 101 in order to perform such work is provided, it is possible to reduce the workload of the person in charge of accounting and/or bookkeeping. Therefore, in recent years, it is being considered to use an image scanner to read documents such as vouchers as electronic images and perform character recognition processing to extract and transfer written information of the documents.

However, a company name may be written in a logo or a special font, or stamped characters may be unclear in a document such as a receipt, and as a result, a recognition error may occur in character recognition processing.

First Embodiment

Each of the following embodiments describes a data input support apparatus that extracts an item name and an item value from a document image and displays the extracted item name and the extracted item value.

Figure 2:
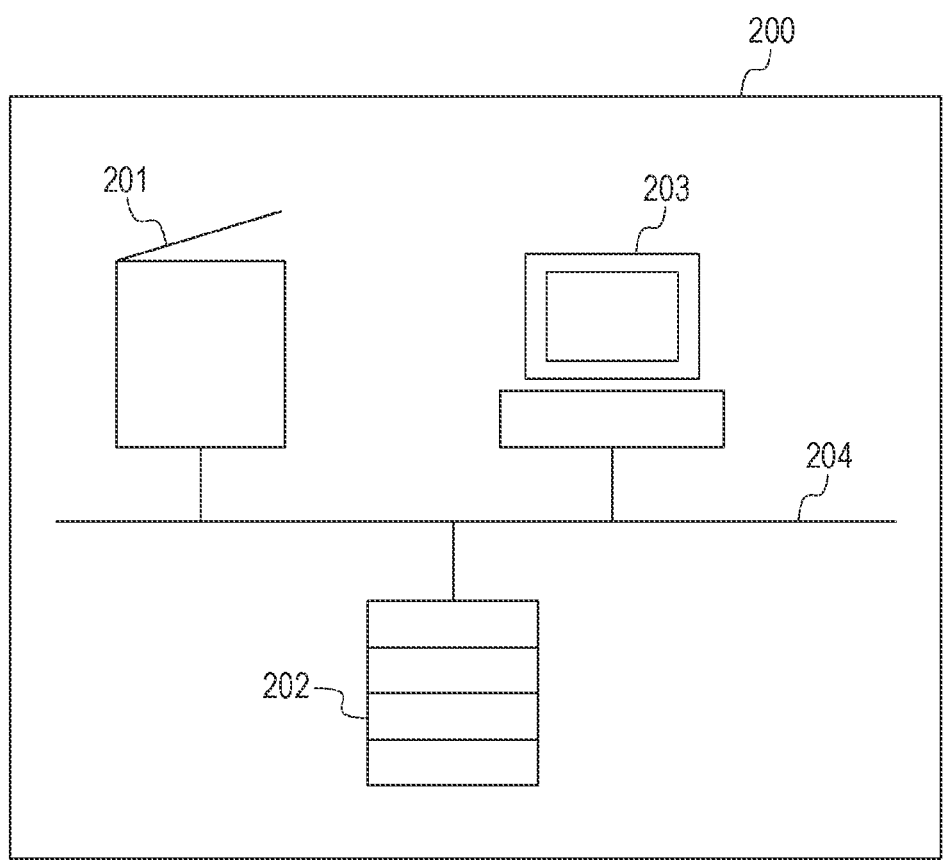
FIG. 2 is a diagram illustrating a system configuration of an image processing system.

FIG. 2 is a diagram illustrating an example of a configuration of an image processing system 200 according to one or more aspects of the present disclosure. The image processing system 200 includes an image forming apparatus 201, an image processing server 202, and a user terminal 203 that are communicably connected to each other via a network 204.

The image forming apparatus 201 can receive, from the user terminal 203, a printing request (print data) to print image data and can print the received image data. The image forming apparatus 201 can read image data by a scanner included in the image forming apparatus 201 and print the image data read by the scanner. In addition, the image forming apparatus 201 can store the print data received from the user terminal 203 and transmit the image data read by the scanner of the image forming apparatus 201 to the user terminal 203 and the image processing server 202. The image forming apparatus 201 can implement functions of a known image forming apparatus such as a multifunction peripheral (MFP). The user terminal 203 can use an application having a user interface to display an image processing result received from the image processing server 202 and interactively process the image processing result in accordance with an instruction from a user. The image processing server 202 may be arranged in a cloud, that is, on the Internet.

In the present embodiment, it is assumed that the user terminal 203 is a general personal computer (PC) with a display, a keyboard, and a mouse, but the user terminal 203 may be a mobile terminal with a touch panel, for example.

In a series of data input support processes, the image forming apparatus 201 scans a document such as a receipt, the image processing server 202 extracts information from an image of the document, and the user uses the user terminal 203 to confirm and modify a result of extracting the information. The series of data input support processes is described below.

Figure 3:
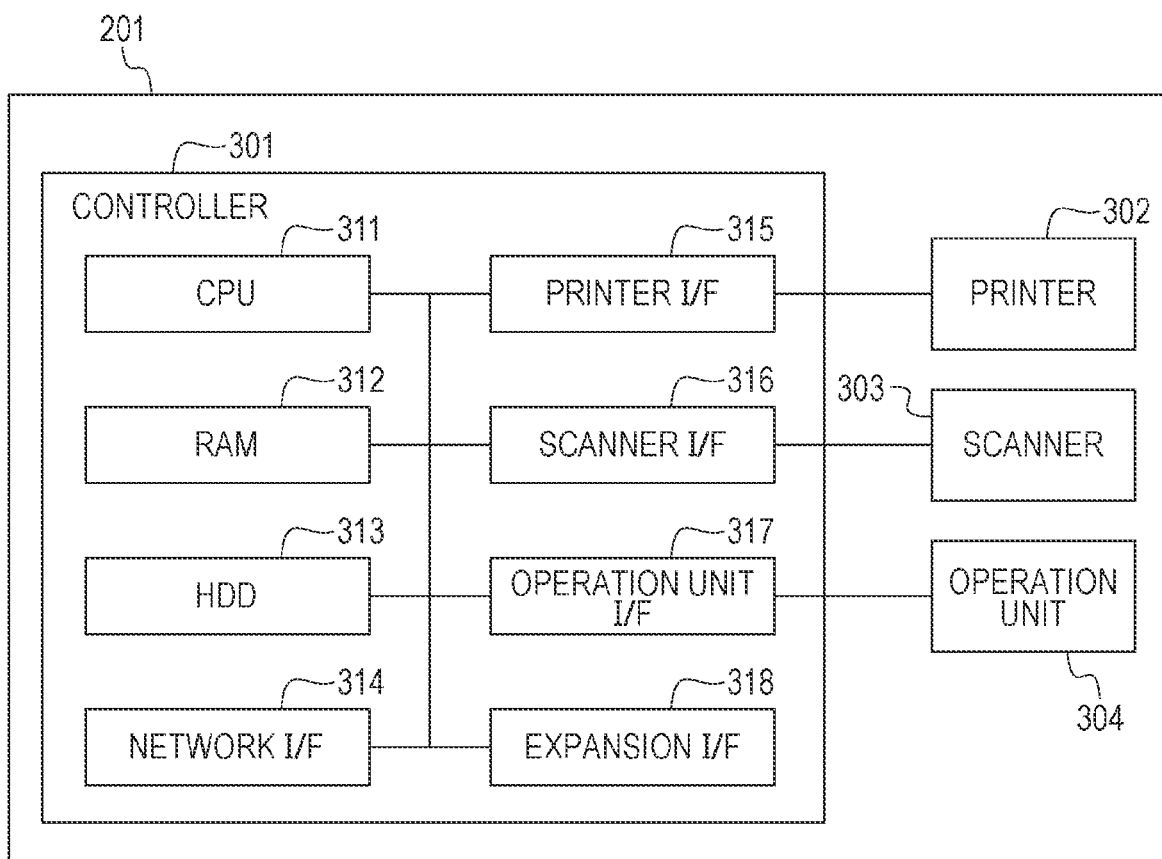
FIG. 3 is a diagram illustrating a hardware configuration of an image forming apparatus.

FIG. 3 is a diagram illustrating an example of a configuration of the image forming apparatus 201. The image forming apparatus 201 includes a controller 301, a printer 302, a scanner 303, and an operation unit 304. The controller 301 includes a CPU 311, a RAM 312, an HDD 313, a network interface (I/F) 314, a printer I/F 315, a scanner I/F 316, an operation unit I/F 317, and an expansion I/F 318.

The CPU 311 controls the overall operation of the image forming apparatus 201. The CPU 311 can control transmission and reception of data to and from the RAM 312, the HDD 313, the network I/F 314, the printer I/F 315, the scanner I/F 316, the operation unit I/F 317, and the expansion I/F 318. In addition, the CPU 311 loads a control program (command) read from the HDD 313 into the RAM 312 and executes the command loaded in the RAM 312.

The HDD 313 stores the control program executable by the CPU 311, a setting value to be used by the image forming apparatus 201, data related to processing requested by the user, and the like. The RAM 312 has a region for temporarily storing the command read by the CPU 311 from the HDD 313. The RAM 312 can store various data necessary to execute the command. For example, in image processing, the CPU 311 can load input data into the RAM 312 and perform processing.

The network I/F 314 is an interface for performing communication with the apparatuses included in the image processing system 200. The network I/F 314 can transmit, to the CPU 311, information indicating that data has been received, and can transmit data in the RAM 312 to the network 204.

The printer I/F 315 can transmit print data transmitted from the CPU 311 to the printer 302 and transmit, to the CPU 311, the state of the printer 302 received from the printer 302. The scanner I/F 316 can transmit, to the scanner 303, an image read instruction transmitted from the CPU 311, transmit image data received from the scanner 303 to the CPU 311, and transmit, to the CPU 311, a state of the scanner 303 received from the scanner 303.

The operation unit I/F 317 can transmit, to the CPU 311, an instruction entered by the user from the operation unit 304 and transmit screen information to be operated by the user to the operation unit 304. The expansion I/F 318 is an interface that enables the image forming apparatus 201 to be connected to an external apparatus. The expansion I/F 318 has a Universal Serial Bus (USB) interface, for example. When an external storage apparatus such as a USB memory is connected to the expansion I/F 318, the image forming apparatus 201 can read data stored in the external storage apparatus and write data to the external storage apparatus.

The printer 302 can print image data received from the printer I/F 315 on paper and transmit the state of the printer 302 to the printer I/F 315. The scanner 303 can read and computerize information indicated on the paper placed on the scanner 303 in accordance with an image read instruction received from the scanner I/F 316 and transmit the computerized information to the scanner I/F 316. In addition, the scanner 303 can transmit the state of the scanner 303 to the scanner I/F 316.

The operation unit 304 is an interface for allowing the user to perform an operation of giving various instructions to the image forming apparatus 201. For example, the operation unit 304 includes a liquid crystal screen having a touch panel, provides an operation screen to the user, and receives an operation from the user.

Figure 4A:
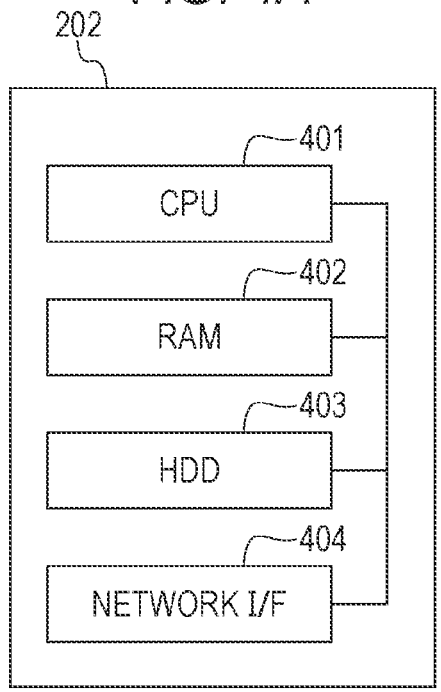
FIGS. 4A and 4B are diagrams illustrating a hardware configuration of an image processing server and a hardware configuration of a user terminal, respectively.

FIG. 4A is a diagram illustrating an example of a configuration of the image processing server 202. The image processing server 202 includes a CPU 401, a RAM 402, an HDD 403, and a network I/F 404. The CPU 401 controls the overall image processing server 202. The CPU 401 can control transmission and reception of data to and from the RAM 402, the HDD 403, and the network I/F 404. In addition, the CPU 401 loads a program (command) read from the HDD 403 into the RAM 402 and executes the command loaded in the RAM 402, thereby functioning as a processing unit that executes processes of flowcharts described below.

Figure 4B:
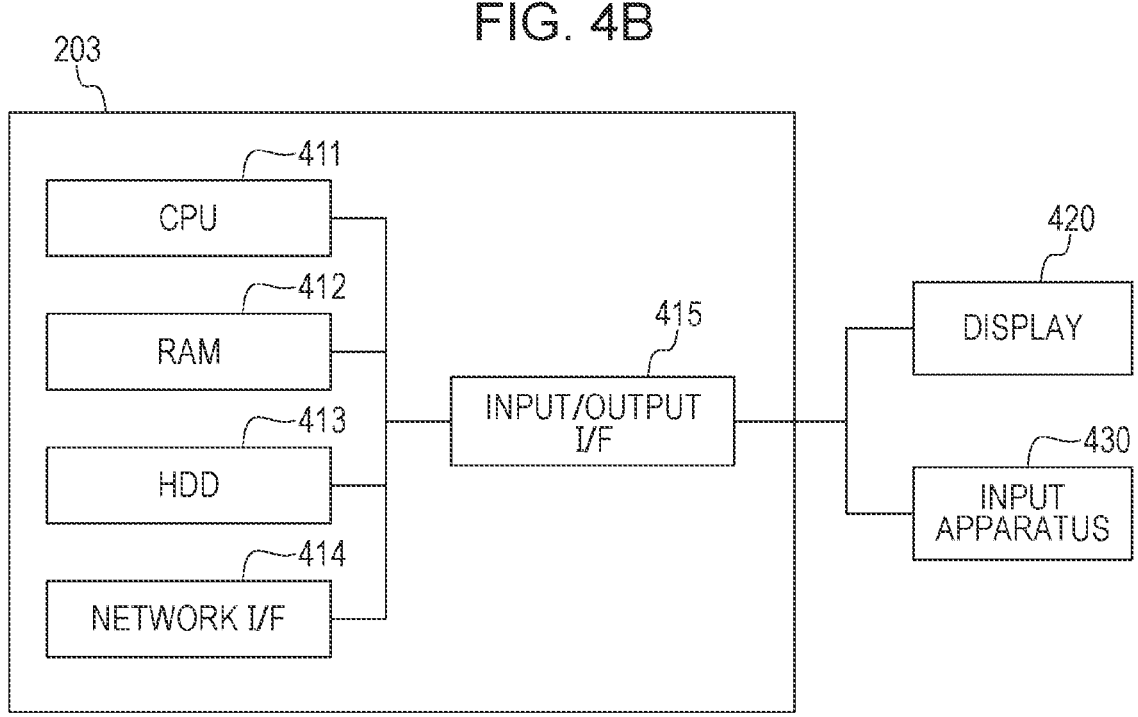

FIG. 4B is a diagram illustrating an example of a configuration of the user terminal 203. The user terminal 203 includes a CPU 411, a RAM 412, an HDD 413, a network I/F 414, and an input/output I/F 415. The CPU 411 controls the overall user terminal 203. The CPU 411 can control transmission and reception of data to and from the RAM 412, the HDD 413, the network I/F 414, and the input/output I/F 415. A display 420 is constituted by a liquid crystal display device or the like and displays display information received from the input/output I/F 415. An input apparatus 430 is constituted by a pointing device such as the mouse or a touch panel and the keyboard. The input apparatus 430 receives an operation from the user and transmits the operation information to the input/output I/F 415. In the HDD 413, an image processing result received from the image processing server 202 via the network I/F 414 can be stored. In the present embodiment, the CPU 411 loads an application program read from the HDD 413 into the RAM 412 and executes the application program loaded in the RAM 412 to cause the input/output I/F 415 to cause the display information to be displayed and to receive a user operation.

Figure 5A:
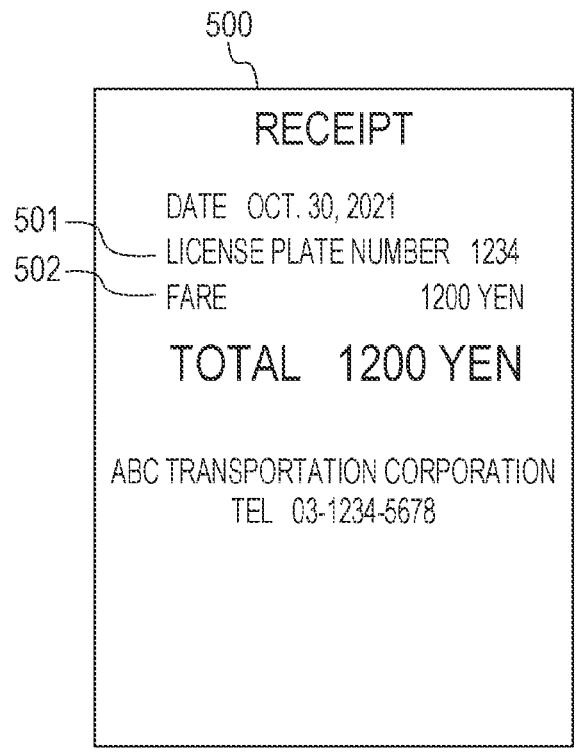
FIGS. 5A and 5B are diagrams illustrating an example of a receipt according to one or more aspects of the present disclosure.
Figure 5B:
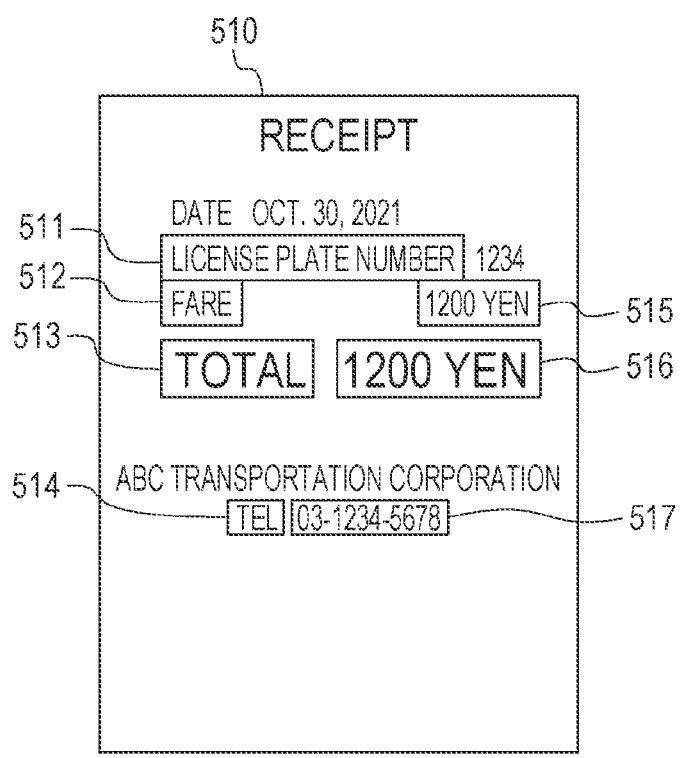

FIGS. 5A and 5B illustrate an example of a document image 500 generated by scanning a document by the image forming apparatus. The example of the document image 500 illustrated in FIG. 5A is an image obtained by reading a taxi receipt by the image forming apparatus 201.

The present embodiment describes a process of extracting company name information from the document image. On the receipt illustrated in FIGS. 5A and 5B, the company name information is issuer information of the receipt to be used to estimate an expense item such as a transportation expense in processing of the accounting system and expense reimbursement. The company name information normally indicates a company name specific to a company. However, in the present embodiment, when the specific company name cannot be identified, information (information of a company name type) of a company classification type, such as a railroad company, an airline company, a taxi, or a toll road, is output. When the classification type can be determined to be a receipt of a railroad company, a receipt of an airline company, a taxi receipt, or the like, it can be estimated that the receipt indicates payment for a transportation expense, and an operation of entering information of the receipt into the accounting system is easily performed. That is, when the specific company name can be identified in a remarks field or the like in the accounting system, the company name information is displayed. Even when the specific company name cannot be identified, it is possible to support an input operation of the user by displaying classification type information of the company. Since the information of the specific company name is originally more detailed, it is desirable to display the information of the specific company name. However, when it is difficult to extract the specific company name for various reasons, the company classification type is identified and displayed using information other than the company name. As a method of extracting the company name, a method of searching for the company name from a document recognition result by using a company name dictionary, and a method of performing pattern extraction to extract a phone number included in the document recognition result according to a character string rule and searching for the company name from a dictionary associated with the company name and the phone number are present, for example. In both methods, when characters at positions corresponding to the company name and the phone number cannot be recognized or when erroneous recognition is performed, the specific company name cannot be identified.

FIG. 6 is a flowchart illustrating a process (process of determining a company classification type) of extracting a company name type according to one or more aspects of the present disclosure. For example, a process in which the document image 500 illustrated in FIG. 5A is input and "taxi" is determined as a company name type (company classification type) is described below.

In S601, the image processing server 202 acquires the document image 500 read by the scanner 303 from the image forming apparatus 201.

In S602, the CPU 401 of the image processing server 202 analyzes the document image 500, detects a character region from the document image 500, and performs character recognition processing on the character region. As a result of the character recognition processing, the CPU 401 identifies coordinates of the character region, coordinates of each character in the character region, and character codes included in the character recognition result. An array of the character codes for each character region obtained in this case is referred to as an OCR character string.

In S603, the CPU 401 of the image processing server 202 loads an information extraction rule stored in the HDD 403 into the RAM 402. The information extraction rule includes a dictionary for extracting an item value, information of a pattern, and a condition for outputting the item value.

FIGS. 7A, 7B, and 7C illustrate examples of the information extraction rule. FIG. 7A is a diagram illustrating a table 700 that indicates a list of dictionaries defined as the information extraction rule. In the table 700, each row defines a dictionary. The table 700 includes a number column, a dictionary name column, and a column indicating a list of search character strings. A dictionary 701 has a name "total key" and is associated with a list of search character strings, such as "total money amount", "amount paid", and "amount received", which may be hints for a total money amount item. A dictionary 702 has a name "phone key" and is associated with a list of search character strings, such as "TEL" and "phone", which may be hints for a phone number item. A dictionary 703 has a name "taxi term A" and is associated with a list of search character strings, such as "taxi" and "limousine", which may be hints for a taxi receipt. A dictionary 704 has a name "taxi term B" and is associated with a list of search character strings, such as "license plate number", "vehicle number", and "radio number", which may be hints for a taxi receipt. A dictionary 705 has a name "taxi term C" and is associated with a list of search character strings, such as "fare" and "meter rate", which may be hints for a taxi receipt. The dictionaries 701 to 705 in the present embodiment are an example for the description, and the present embodiment is not limited thereto.

FIG. 7B is a diagram illustrating a table 710 of a list of patterns defined as the information extraction rule. In the table 710, each row defines a pattern. The table 710 includes a number column, a pattern name column, and a column for regular expressions indicating search patterns. A pattern 711 has a name "money amount" and is to extract a character string pattern matching a regular expression "\?[\d,]+yen". The regular expression of the pattern 711 means a character string pattern in which the sign "\" is not present or one sign "\" is present at the initial position, one or more numbers and one or more commas are consecutively present, and the characters "yen" are present at the end position. For example, a character string "\1,000 yen" or the like matches this pattern. The regular expression for the money amount is an example for the description. Other patterns for extracting a character string indicating the value of a money amount and a pattern based on erroneous recognition of a character recognition result or a variation in the character recognition result may be used. A plurality of search patterns may be used. In addition, a method of expressing a search pattern is not limited to the regular expression. A pattern 712 has a name "phone number" and a character string pattern matching a regular expression "0\d{1, 3}[-(]\d{2, 4}[-)]\d{4}". The regular expression of the pattern 712 means a character string pattern in which the first character is "0", one to three characters are consecutively present after the first character, one sign "-" or "(" is present next, two to four numbers are present next, one sign "-" or ")" is present next, and four numbers are consecutively present at the end. For example, a character string indicating a phone number "03(1234) 5678" or the like matches this pattern. The regular expression of the phone number is an example for the description, and the present embodiment is not limited thereto, similarly to the pattern for searching for a money amount.

In S604, the CPU 401 of the image processing server 202 performs a text search to search for a character string matching a condition for a search character string of the dictionary list 700 loaded in S603 from the OCR character string of the character recognition result obtained in S602. FIG. 5B illustrates results of performing the text search from the OCR character string. A search result 511 is a result of searching for "license plate number" from the taxi term B of the dictionary 704. A search result 512 is a result of searching for "fare" from the taxi term C of the dictionary 705. A search result 513 is a result of searching for "total" from the total key of the dictionary 701. A search result 514 is a result of searching for "TEL" from the phone key of the dictionary 702.

In S605, the CPU 401 of the image processing server 202 performs a text search to search for a character string matching a search pattern of the pattern list 710 loaded in S603 from the OCR character string of the character recognition result obtained in S602. Search results 515 and 516 illustrated in FIG. 5B are results of searching for a money amount matching the search pattern of the pattern 711. In addition, a search result 517 illustrated in FIG. 5B is a result of searching for a phone number matching the search pattern of the pattern 712.

FIG. 7C illustrates a table 720 that is an example of an output condition for an item value based on the text search results of S604 and S605. The table 720 includes a number column for output condition numbers, an item name column for item names to be output, a type column, a condition column for output conditions, a column indicating text search results to be determined, and an output value column. An output value indicates what is output as an item value when search results match an output condition. The output value indicates, as an output target, a "search result value (value of a text search result determined as a value) determined as a value" or indicates, as an output target, a character string of an item value, such as "taxi". "Positions of search results" written in the type column in the table 720 indicate that the positions of the text search results are to be used for condition determination. In addition, "logical operation of search results" written in the type column indicates that calculation is performed by a logical operation by using the text search results.

The condition column when the type column indicates "positions of search results" in the table 720 indicates which condition the position relationship of the text search results satisfies to output a value. For example, the expression "the value is to the right of the key" in the condition column indicates that the positions of two text search results of the key and the value satisfy the condition when the value is to the right of the key. For example, an output condition 721 illustrated in FIG. 7C has an item name "total money amount" and is an output condition in which an item value is output when a text search result of the "total key" is used as the key, a text search result of the "money amount" is used as the value, and the value is to the right of the key. The output condition 721 is described as a rule and indicates that the value of the money amount in the "money amount pattern" 711 written on the right side of the character strings "total money amount" and "amount paid" of the "total key" dictionary 701 is likely to be the total money amount on the receipt. Similarly, an output condition 722 having an item name "phone number" is an output condition in which a value is output when a text search result of the "phone key" is used as the key, a text search result of the "phone number" is used as the value, and the value is to the right of the key.

In addition, the condition column when the type column indicates "logical operation of search results" in the table 720 indicates which logical operation expression the search results satisfy to output a value. An expression indicating that a "logical operation result is true" indicates that the value is output when a logical operation result of a designated logical expression is true. For example, an output condition 723 illustrated in FIG. 7C is an output condition in which taxi is output when logical operation of search results is used as the type and a logical expression "taxi term A|(taxi term B & taxi term C)" is true. The output condition 723 is described as a rule and indicates that when the "taxi term A" of the dictionary 703 is present or when a character string belonging to the "taxi term B" of the dictionary 704 and the "taxi term C" of the dictionary 705 is present, the output of the item value of the company name type is set to taxi. That is, the "taxi term A" of the dictionary 703 is a strong term that can be determined as a taxi by itself. Each of the "taxi term B" of the dictionary 704 and the "taxi term C" of the dictionary 705 is weak as a basis for indicating a taxi by itself. However, when both the "taxi term B" and the "taxi term C" simultaneously appear, the "taxi term B" and the "taxi term C" are likely to indicate a taxi.

In S606, the CPU 401 of the image processing server 202 determines an item value to be output, that is, an output value corresponding to the item names of the total money amount, the phone number, and the company name type based on the output condition of the rule loaded in S603, and outputs the determined value. The item value output process in S606 is described in detail with reference to a flowchart of FIG. 8.

Figure 8:
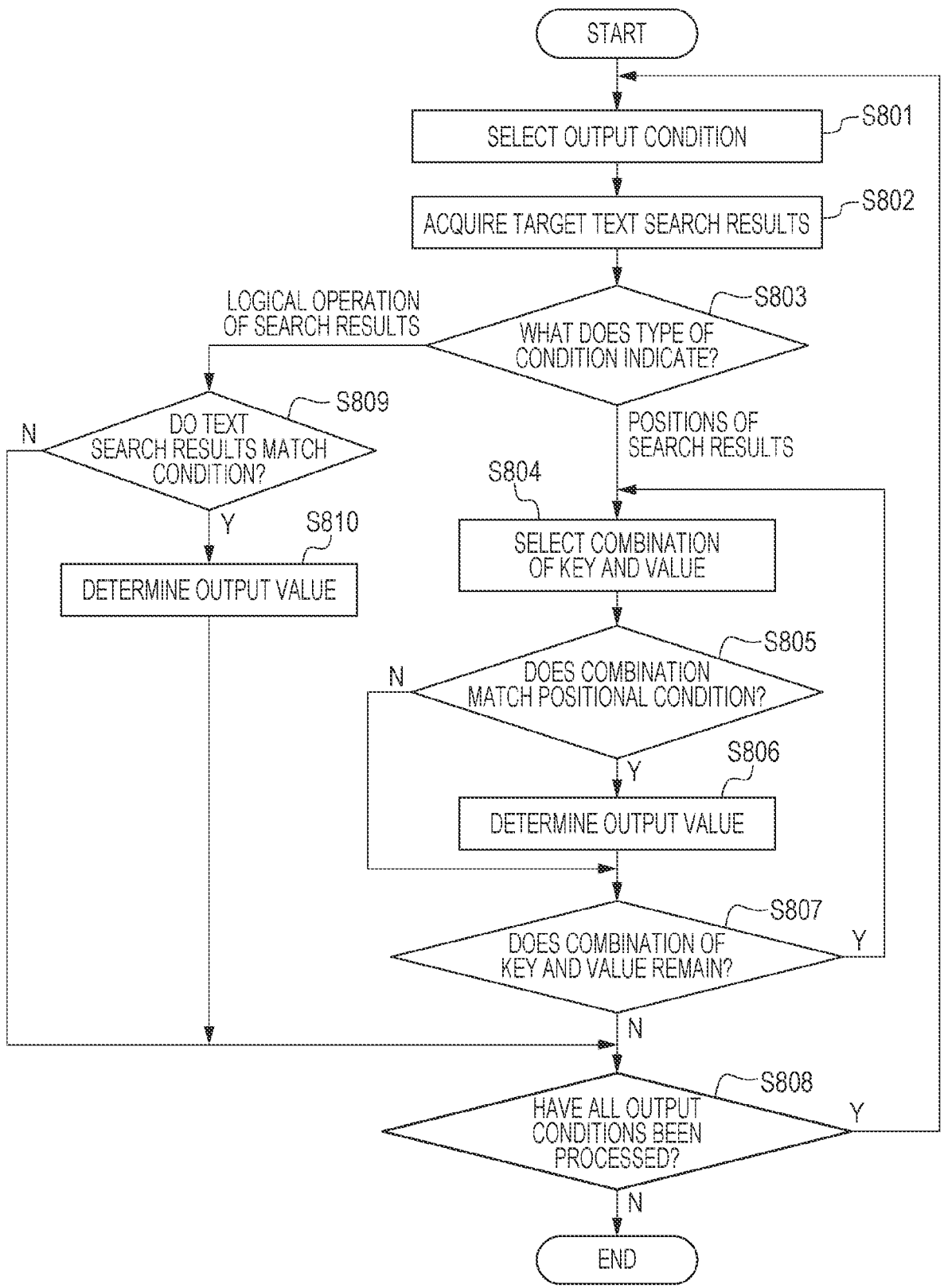
FIG. 8 is a diagram illustrating an item value output process according to one or more aspects of the present disclosure.

FIG. 8 is a flowchart illustrating details of the item value output process according to one or more aspects of the present disclosure.

In S801, the CPU 401 of the image processing server 202 sequentially selects output conditions of rules loaded in S603, and the process proceeds to S802. For example, it is assumed that the output condition 721 illustrated in FIG. 7C is selected first.

In S802, the CPU 401 of the image processing server 202 acquires text search results to be targets for the output condition from the text search results of S604 and S605. Since the text search result of the "total key" as a key and the text search result of the "money amount" as a value are targets for the output condition 721, the CPU 401 acquires the corresponding text search result 513 of the "total key" and the corresponding text search results 515 and 516 of the "money amount".

In S803, the CPU 401 of the image processing server 202 determines the type of the output condition. When the type is "positions of search results", the process proceeds to S804. When the type is "logical operation of search results", the process proceeds to S809. When the output condition 721 is selected, the type is "positions of search results" and the process proceeds to S804.

In S804, the CPU 401 of the image processing server 202 selects one text search result, which can be a key, and one text search result, which can be a value, and creates a combination of the selected text search results. Since the key for the output condition 721 is the text search result 513 and values for the output condition 721 are the text search results 515 and 516, two combinations, a combination of the text search result 513 and the text search result 515 and a combination of the text search result 513 and the text search result 516 are present. First, the CPU 401 selects the text search result 513 and the text search result 515, and the process proceeds to S805.

In S805, the CPU 401 of the image processing server 202 determines whether the combination of the key and the value selected in S805 matches the positional condition. When the combination matches the positional condition, the process proceeds to S806. When the combination does not match the positional condition, the process proceeds to S807. Since the positional condition of the output condition 721 is that "the value is to the right of the key", the CPU 401 uses coordinate values of the text search results to determine whether the text search result 515 is to the right of the text search result 513. In the present embodiment, the determination of whether "the value is to the right of the key" is described below using a coordinate system with the top left origin. When rectangular coordinates of the text search result of the key are top left coordinates (KX1, KY1) and bottom right coordinates (KX2, KY2), and rectangular coordinates of the text search result of the value are top left coordinates (VX1, VY1) and bottom right coordinates (VX2, VY2), it suffices to satisfy "KX2<VX1", "KY2>VY1", and "KY1<VY2".

That is, the condition is that the X coordinate value of the left end of the text search result of the value is larger than the X coordinate value of the right end of the text search result of the key and that a range of the Y coordinate values of the rectangle of the text search result of the key overlaps a range of the Y coordinate values of the rectangle of the text search result of the value. The method of determining whether the value is to the right of the key according to the present embodiment is an example, and another method may be used. Since the text search result 513 and the text search result 515 do not match the condition, the process proceeds to S807.

In S807, the CPU 401 of the image processing server 202 determines whether a remaining combination of the key and a value is present. When the remaining combination is present, the process proceeds to S804. When the remaining combination is not present, the process proceeds to S808. After the determination is performed on the combination of the text search result 513 and the text search result 515, the remaining combination of the key and the value is present and the process proceeds to S804. The CPU 401 selects the combination of the text search result 513 and the text search result 516 as the next combination, and the process proceeds to S805. In S805, the text search result 516 of the value is to the right of the text search result 513 of the key and thus the process proceeds to S806.

In S806, since the text search result 513 of the key and the text search result 516 of the value satisfy the output condition 721, the CPU 401 of the image processing server 202 determines an output value of the output condition 721, and the process proceeds to S807. That is, since the text search result 513 of the key and the text search result 516 of the value satisfy the condition of the output condition 721, the CPU 401 determines the text search result 516 as the "total money amount" as the output. Thereafter, in S807, since all the combinations of the text search results of the "total money amount" are processed, the process proceeds to S808.

In S808, the CPU 401 of the image processing server 202 determines whether all the output conditions have been processed. When an unprocessed output condition remains, the process proceeds to S801. When an unprocessed output condition does not remain, the process ends.

When the determination of the output condition 721 is completed, the output conditions 722 and 723 are not yet processed, the process proceeds to S801, the next output condition 722 is set as a processing target, and the process proceeds to S802.

Since the output condition 722 indicates "positions of search results" in the same manner as the output condition 721, the processes are performed in S802 to S808 in a similar manner. The CPU 401 evaluates a combination of the text search result 514 of the key and the text search result 517 of the value, determines that the combination matches the output condition 722, and determines the text search result 517 as an output value of the "phone number".

After the determination processing for the output condition 722 is completed, the output condition 723 is set as a processing target in S801, and the process proceeds to S802. In S802, the CPU 401 acquires text search results for the "taxi term A" of the dictionary 703, the "taxi term B" of the dictionary 704, and the "taxi term C" of the dictionary 705 as targets from the text search results of S604 and S605. As a result, a text search result of the "taxi term A" of the dictionary 703 is not present, and the CPU 401 can acquire the text search result 511 for the "taxi term B" of the dictionary 704 and the text search result 512 for the "taxi term C" of the dictionary 705, and the process proceeds to S803. In S803, since the type of the output condition 723 indicates logical operation of search results, and the process proceeds to S809.

In S809, the CPU 401 of the image processing server 202 determines whether the text search results match the logical expression of the output condition 723. When the text search results match the logical expression of the output condition 723, the process proceeds to S810. When the text search results do not match the logical expression of the output condition 723, the process proceeds to S808. The output condition 723 is whether the logical expression "taxi term A|(taxi term B & taxi term C)" is true. When the numbers of text search results acquired in S802 are applied to the logical expression of the output condition 723, the logical expression is "0|(1 & 1)" and is true, the text search results match the output condition 723, and the process proceeds to S810.

In S810, since the output condition 723 is satisfied, the CPU 401 of the image processing server 202 determines an output value of the output condition 723, and the process proceeds to S808. For the output condition 723, the CPU 401 determines "taxi" as the output value of the "company name type (company classification type)". Thereafter, in S808, since all the output conditions are already processed, the process ends.

In the present embodiment, the one output condition (output condition 723) of the item name of the company name type (company classification type) is used for the description, but normally it is necessary to add output conditions for the number of types of company name types to be determined.

Return to the description of the flowchart of FIG. 6. In S607, the CPU 401 of the image processing server 202 confirms whether the phone number output in S605 is present in the company name dictionary. When the phone number output in S605 is present in the company name dictionary, the CPU 401 identifies the company name from the search result and outputs the search result as the item name "company name". The company name dictionary is a database in which phone numbers are associated with company names and it is possible to identify the company name from the phone number. However, it is difficult to cover phone numbers of all company names. When a recognition error is present in OCR, it is not possible to search for the company name. For example, when "03-1234-5678" is obtained as the phone number from the receipt 500, but the company name cannot be acquired from the company name dictionary, the CPU 401 determines that the company name is not present and the process proceeds to S608. Although the method of searching for the company name using the phone number is used, the method is not limited thereto. As described above, the company name itself may be searched not only from the phone number but also from the character recognition result.

In S608, the CPU 401 of the image processing server 202 determines final company name information in accordance with the "company name" and the "company name type (company classification type)" determined in S601 to S607. When the output value of the "company name" is present, the CPU 401 determines the output value of the "company name". When the output value of the "company name" is not present and the output value of the "company name type (company classification type)" is present, the CPU 401 determines the output value of the "company name type (company classification type)". When the output value of the "company name" and the output value of the "company name type (company classification type)" are not present, the CPU 401 determines that the output values are not present. In this example, since the output value of the "company name" is not present and the output value of the "company name type" is present, "taxi" as the "company name type (company classification type)" is determined as output of the final "company name information".

As a result of the application of the processes of the flowcharts of FIGS. 6 and 8, in the example of the receipt 500, the three items, the text search result 516 as the "total money amount", the text search result 517 as the "phone number", and "taxi" as the "company name information", and values of the three items are output.

Figure 9:
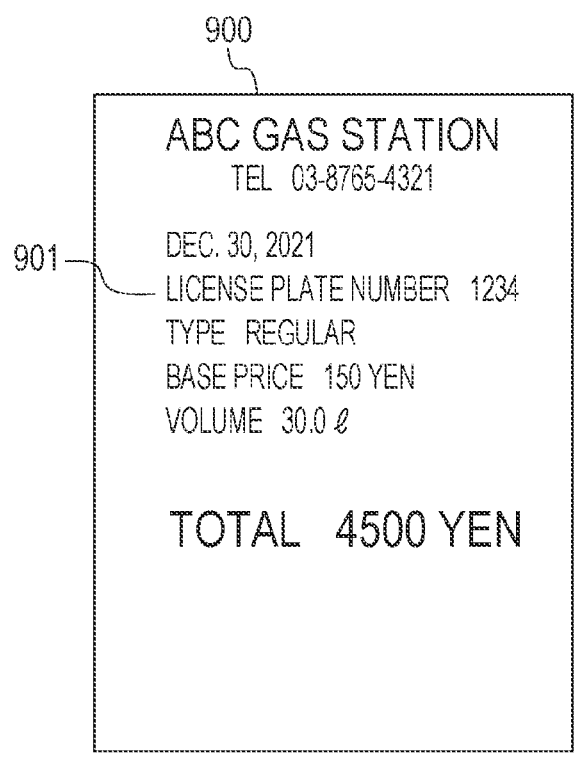
FIG. 9 is a diagram illustrating an example of a receipt according to one or more aspects of the present disclosure.

FIG. 9 illustrates a receipt 900 that is an example of a receipt of a gas station. A case where the processes of S601 to S608 are performed on the receipt 900 by using the information extraction rule illustrated in FIGS. 7A to 7C is described below. As a result of performing a text search on a document recognition result in S603 and S604, the following results are obtained. The results are that no result is obtained for the "taxi term A" of the dictionary 703, a "license plate number" of a text search result 901 is obtained for the "taxi term B" of the dictionary 704, and no result is obtained for the "taxi term C" of the dictionary 705. When the numbers of text search results are applied to the logical expression of the output condition 723, the logical expression is "0|(1 & 0)", the text search results do not match the output condition 723 in S809, and thus output is not performed for the "company name type".

As described above, when the present embodiment is applied, it is possible to output "taxi" as the company name type (company classification type) by performing a search using the dictionaries and the patterns based on a character string of the document recognition result and performing the logical operation on a result of the search. In addition, for a receipt that includes similar terms and is not a taxi receipt, output is not performed for a company name type without erroneous determination.

In the present embodiment, a rule-based condition for identifying classification types that are hints for expense items whose definitions may differ for each user without identifying the expense items is defined in advance. To process a document image, a company classification type identified based on the rule-based condition is used.

Second Embodiment

In the first embodiment, the appearance of the terms is determined based on the document recognition result and the company name type (company classification type) is determined based on the numbers of logical operation results. However, another condition, for example, input image information such as the size of a receipt may be used.

FIG. 10A illustrates an example of an input document image. It is assumed that the input document image is a receipt 1000 of a railroad company. On the receipt 1000, only a logo 1001 is present as a hint for the company name of the railroad company or a receipt of the railroad company. Normally, it is difficult to recognize an image with a decoration such as a logo by OCR, and thus it is difficult to directly identify a company name from an OCR character string. However, a receipt issued by a railroad company and having the same size as a ticket may be output. The size of the receipt may have a feature. A method using an image size as an output condition type is described below.

FIG. 10B illustrates a table 1010 indicating an information extraction rule according to one or more aspects of the present disclosure. Output conditions 721 to 723 indicated in the table 1010 are the same as the output conditions 721 to 723 indicated in the table 720 illustrated in FIG. 7C. An output condition 1011 is a condition for identifying a company name type. When an image size is a width of 85 mm and a height of 58 mm, "railroad" is output based on the output condition 1011. An "image size" is newly included as a type in the output condition 1011. The "image size" indicates that, when size information of an input image is a defined size, "railroad" is output.

FIG. 10C illustrates a table 1020 indicating image information acquired from the receipt 1000 in S601. The image information indicated in the table 1020 indicates a resolution of 300 dpi in the width direction and a resolution of 300 dpi in the height direction and indicates 1000 pixels in the width direction and 680 pixels in the height direction.

Figure 11:
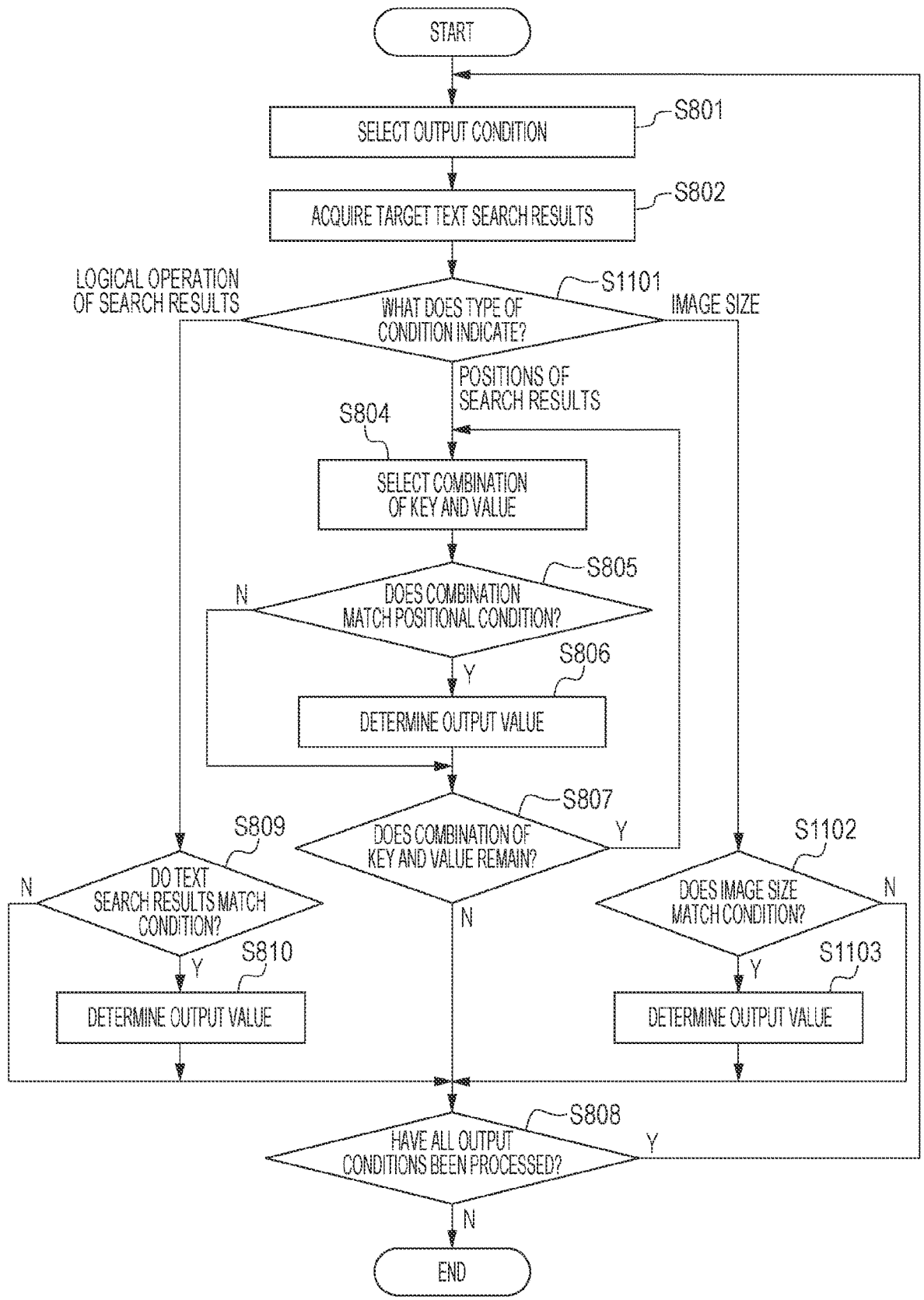
FIG. 11 is a diagram illustrating an item value output process according to one or more aspects of the present disclosure.

FIG. 11 is a flowchart illustrating an item value output process using an image size according to one or more aspects of the present disclosure. Processes of steps (S801, S802, and S804 to S810) denoted by the same signs as those of the flowchart of FIG. 8 are the same as or similar to the corresponding steps illustrated in FIG. 8, and a detailed description thereof is omitted.

In S1101, the CPU 401 of the image processing server 202 determines the type of an output condition. When the type of the output condition indicates "positions of search results", the process proceeds to S804. When the type of the output condition indicates "logical operation of search results", the process proceeds to S809. When the type of the output condition indicates "image size", the process proceeds to S1102.

In S1102, the CPU 401 of the image processing server 202 determines whether the size of a detected original document image matches the condition. When the size matches the condition, the process proceeds to S1103. When the size does not match the condition, the process proceeds to S808. In the present embodiment, it is assumed that the image to be processed is an image cropped according to the outline of the original document. However, when the image to be processed is not cropped, the CPU 401 may detect the outline of the original document, calculate the size of the original document, and determine whether the size of the original document matches the condition.

In S1103, the CPU 401 of the image processing server 202 determines an output value. When the receipt 1000 is processed according to the flowchart illustrated in FIG. 11, the CPU 401 determines whether the receipt 1000 matches the size of the output condition 1011 in S1102. 1000 pixels in the width direction correspond to 85 mm according to the resolution of 300 dpi, 680 pixels in the height direction correspond to 58 mm according to the resolution of 300 dpi, the size of the receipt 1000 matches the image size of the output condition 1011, and thus "railroad" is output as a company name type (company classification type).

In the example of the output condition 1011, only the image size is used as the condition. However, the present embodiment is not limited thereto. Not only the image size but also a composite condition obtained by combining logical operation results obtained from text search results obtained from an OCR character string may be used.

In addition, not only the image size but also features of the original document, such as a color of the paper and the background of the paper, may be used.

As described above, when the present embodiment is applied, an output value can be output as a company name type by using image information such as an image size even when a feature of the company name type is not obtained from an OCR character string.

Third Embodiment

In the first embodiment, when both company name type (company classification type) and specific company name are identified, the specific company name is output as final information regarding the company name in S608. Normally, when the company name type and the specific company name are present, the specific company name is more detailed information than the company name type, and thus the company name type is used as auxiliary information for expense reimbursement in a case where it is difficult to extract the company name. However, in a certain case, it may be desirable to output the company name type (classification type).

Figure 12:
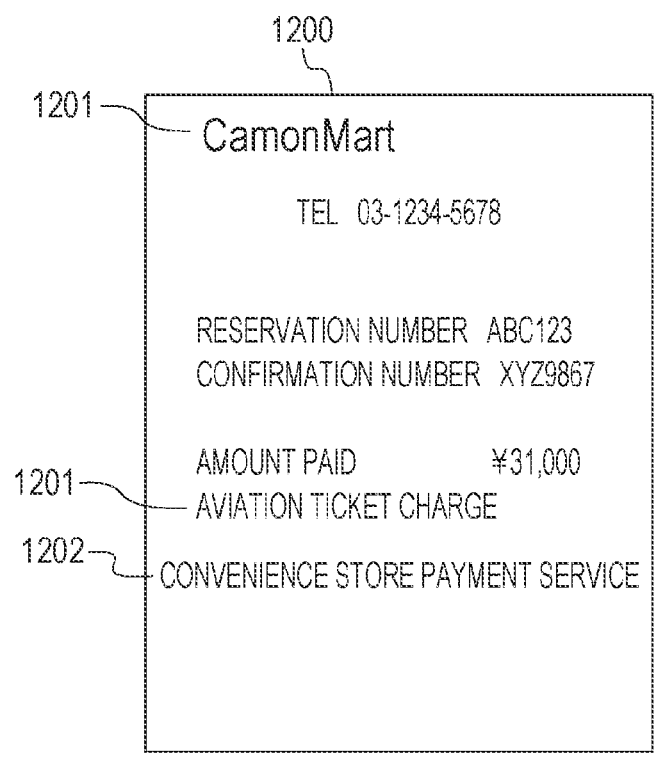
FIG. 12 is a diagram illustrating an example of a receipt according to one or more aspects of the present disclosure.

FIG. 12 illustrates a receipt 1200 for an airline ticket according to one or more aspects of the present disclosure. The receipt 1200 is a receipt obtained when payment is made for the airline ticket at a convenience store, and a company name and a phone number of the convenience store are written on the receipt 1200. When the phone number and the company name dictionary are used in order to output the company name, the company name is "CamonMart" that is the name of the convenience store. However, in expense reimbursement work, it is more appropriate to output a type, which is an airline ticket, as support information for inputting the purpose of use than outputting the company name specific to the convenience store.

FIGS. 13A, 13B, and 13C illustrate examples of a rule according to one or more aspects of the present disclosure. FIG. 13A illustrates a table 1300 that is a list of dictionaries 1301, 1302, 1303, and 1304. The dictionary 1301 is a dictionary of airline ticket terminology including search character strings "airline" and "aviation", which are hints for the fact that a company name type (purchase type) is an airline ticket. The dictionary 1302 is a dictionary of convenience store terminology including a search character string "convenience store", which is a hint for issuance by a convenience store. The dictionary 1303 is a dictionary of website terminology including a "display date", which is a hint for a receipt issued via a website. The dictionary 1304 is a dictionary of agency terminology including search character strings such as "travel", "agent", and "agency", which are hints for a receipt issued by a travel agency.

FIG. 13B illustrates a table 1310 that is a list of output conditions using the terms described above. An output condition 1311 has an item name "company name type (purchase type)", a condition type "logical operation of search results", and a condition "airline ticket terminology and convenience store terminology" and is to output "airline ticket (convenience store)" as an output value. An output condition 1312 has an item name "company name type (purchase type)", a condition type "logical operation of search results", and a condition "airline ticket terminology and website terminology" and is to output "airline ticket (online)" as an output value. An output condition 1313 has an item name "company name type (purchase type)", a condition type "logical operation of search results", and a condition "airline ticket terminology and agency terminology" and is to output "airline ticket (agency)" as an output value. The fact that the item names of the output conditions 1311, 1312, and 1313 are defined as the company name type (purchase type) indicates that information of a vendor where an airline ticket is purchased, that is, where payment is made for the airline ticket, is additionally output in addition to information of the company name type. The output condition 1311 is to output "airline ticket (convenience store)", that is, information indicating an airline ticket paid for at a convenience store when a term indicating an airline ticket and a term indicating a convenience store are present. The output condition 1312 is to output "airline (online)", that is, information indicating an airline ticket paid for online when a term indicating an airline ticket and a term indicating issuance via a website are present. The output condition 1313 is to output "airline ticket (agency)", that is, information indicating an airline ticket paid for at an agency when a term indicating an airline ticket and a term indicating issuance at an agency are present.

A case where the processes indicated in the flowcharts of FIGS. 6 and 8 are performed on an image of the receipt 1200 in accordance with the dictionaries indicated in the table 1300 and the output conditions indicated in the table 1310 is described below. On the receipt 1200, "aviation" of the text search result 1201 searched using the dictionary 1301 and "convenience store" of the text search result 1202 searched using the dictionary 1302 are present. Therefore, the text search results match the condition of the output condition 1311 and an output value of "airline ticket (convenience store)" is obtained as a company name type (purchase type).

FIG. 13C illustrates a table 1320 that is a list of conditions for determining, in S608, company name information to be output. A company name information determination condition list 1320 includes a condition number column, a condition column indicating whether a company name has been acquired, a condition column indicating whether a company name type (purchase type) has been acquired, a condition column indicating a purchase type, and a column indicating an output value as output of company name information when results match a condition. The determination is made in order from the top row in the table, and output of company name information corresponding to a row indicating that results match a condition is used. A company name information determination condition 1321 indicates that a "company name type (purchase type)" is output as company name information when a "company name" is present, a "company name type" is present, and a "purchase type" is a convenience store. A company name information determination condition 1322 indicates that a "company name type (purchase type)" is output as company name information when a "company name" is present, a "company name type" is present, and a "purchase type" is an agency. A company name information determination condition 1323 indicates that a "company name" is used as company name information when the "company name" is present and a "company name type (purchase type)" is not acquired. A company name information determination condition 1324 indicates that a "company name type (purchase type)" is output when a "company name" is not present and a "company name type" is present. A company name information determination condition 1325 indicates that company name information is not output when a "company name" and a "company name type" are not acquired.

When company name information is determined based on this table 1320, the results obtained from the receipt 1200 matches the company name information determination condition 1321, and a purchase type "airline ticket" is output as company name information, instead of a company name.

As described above, when the present embodiment is applied, it is possible to output a value necessary for expense reimbursement work by prioritizing a value of a company name type under a certain condition other than necessarily using a specific company name when the company name is simply obtained.

Other Embodiment

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory apparatus, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-177091 filed Oct. 29, 2021, which is hereby incorporated by reference herein in its entirety.

What is claimed is:

1. An image processing apparatus comprising:
at least one memory that stores a program; and
at least one processor that executes the program to perform:
obtaining, by character recognition processing, one or more character strings recognized from a document image obtained by scanning a document;
identifying information on a company which issued the document based on the obtained one or more character strings and a predefined condition;
identifying a company name of the company which issued the document, the company name being included in the obtained one or more character strings; and
outputting information on a company name,
wherein the identified company name is output as the information on the company name in a case where the company name is identified, and
wherein the identified information on the company is output as the information on the company name instead of the company name in a case where the company name is not identified and the information on the company is identified.

2. The image processing apparatus according to claim 1, wherein the predefined condition is whether a predetermined character string is present in the obtained one or more character strings.

3. The image processing apparatus according to claim 1, wherein the predefined condition includes a condition based on a logical operation.

4. The image processing apparatus according to claim 1, wherein the predefined condition includes a condition based on an image size.

5. The image processing apparatus according to claim 1, wherein the first identifying unit identifies the information on a company which issued the document and information of a vendor is identified based on the obtained one or more character strings and another predefined condition.

6. The image processing apparatus according to claim 1, wherein the predetermined condition includes a condition based on a search for a database.

7. An image processing method comprising:
obtaining by character recognition processing, one or more character strings recognized from a document image obtained by scanning a document; and
identifying information on a company which issued the document based on the obtained one or more character strings and a predefined condition;
identifying a company name of the company which issued the document, the company name being included in the obtained one or more character strings; and
outputting information on a company name,
wherein the identified company name is output as the information on the company name in a case where the company name is identified, and
wherein the identified information on the company is output as the information on the company name instead of the company name in a case where the company name is not identified and the information on the company is identified.

8. The image processing method according to claim 7, wherein the predefined condition is whether a predetermined character string is present in the obtained one or more character strings.

9. The image processing method according to claim 7, wherein the predefined condition includes a condition based on a logical operation.

10. The image processing method according to claim 7, wherein the predefined condition includes a condition based on an image size.

11. The image processing method according to claim 7, wherein in the first identifying step, identifies the information on a company which issued the document and information of a vendor is identified based on the obtained one or more character strings and another predefined condition.

12. A non-transitory computer-readable storage medium that stores a program,
wherein the program causes a processor to perform:
obtaining by character recognition processing, one or more character strings recognized from a document image obtained by scanning a document;
identifying information on a company which issued the document based on the obtained one or more character strings and a predefined condition;
identifying a company name of the company which issued the document, the company name being included in the obtained one or more character strings; and
outputting information on a company name,
wherein the identified company name is output as the information on the company name in a case where the company name is identified, and
wherein the identified information on the company is output as the information on the company name instead of the company name in a case where the company name is not identified and the information on the company is identified.

13. The non-transitory computer-readable storage medium according to claim 12, wherein the predefined condition is whether a predetermined character string is present in the obtained one or more character strings.

14. The non-transitory computer-readable storage medium according to claim 12, wherein the predefined condition includes a condition based on a logical operation.

15. The non-transitory computer-readable storage medium according to claim 12, wherein the predefined condition includes a condition based on an image size.

16. The non-transitory computer-readable storage medium according to claim 12, wherein in the identifying the information on a company which issued the document and information of a vendor is identified based on the obtained one or more character strings and another predefined condition.

* * * * *